(12) United States Patent
Brown et al.

(10) Patent No.: US 7,496,622 B2
(45) Date of Patent: Feb. 24, 2009

(54) ALTERNATIVE REGISTRY LOOKUP OF WEB SERVICES

(75) Inventors: Kyle Gene Brown, Apex, NC (US); Rachel Miriamne Reinitz, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 10/803,140

(22) Filed: Mar. 17, 2004

(65) Prior Publication Data

US 2005/0209984 A1 Sep. 22, 2005

(51) Int. Cl.
G06F 15/16 (2006.01)
G06F 7/00 (2006.01)
G06F 17/30 (2006.01)

(52) U.S. Cl. .................................... 709/203; 707/1

(58) Field of Classification Search ................ None
See application file for complete search history.

(56) References Cited

U.S. PATENT DOCUMENTS

| | | | | |
|---|---|---|---|---|
| 7,155,425 B2* | 12/2006 | Nykanen | ......................... | 707/3 |
| 7,181,442 B2* | 2/2007 | Yeh et al. | ........................ | 707/3 |
| 7,266,582 B2* | 9/2007 | Stelting | ....................... | 709/201 |
| 2002/0143819 A1 | 10/2002 | Han et al. | .................... | 707/513 |
| 2002/0169852 A1 | 11/2002 | Schaeck | ...................... | 709/218 |
| 2002/0174178 A1* | 11/2002 | Stawikowski | ................ | 709/203 |
| 2003/0055878 A1 | 3/2003 | Fletcher et al. | .............. | 709/203 |
| 2003/0105846 A1 | 6/2003 | Zhao et al. | .................. | 709/221 |
| 2003/0133554 A1 | 7/2003 | Nykanen et al. | ........ | 379/201.01 |
| 2003/0163450 A1 | 8/2003 | Borenstein et al. | .............. | 707/1 |
| 2003/0187841 A1* | 10/2003 | Zhang et al. | .................... | 707/4 |
| 2003/0191802 A1* | 10/2003 | Zhao et al. | ................... | 709/203 |
| 2003/0191803 A1 | 10/2003 | Chinnici et al. | .............. | 709/203 |
| 2003/0204645 A1* | 10/2003 | Sharma et al. | ............... | 709/328 |
| 2003/0220993 A1 | 11/2003 | Blizniak et al. | .............. | 709/223 |
| 2004/0030740 A1* | 2/2004 | Stelting | ....................... | 709/201 |
| 2004/0122926 A1* | 6/2004 | Moore et al. | ................. | 709/223 |
| 2004/0128345 A1* | 7/2004 | Robinson et al. | ............ | 709/203 |
| 2005/0198206 A1* | 9/2005 | Miller et al. | ................. | 709/219 |

OTHER PUBLICATIONS

Mandayam et al., "An Architecture for Dynamic Discovery Service", Proceedings of the ISCA 3rd International Conference Information Reuse and Integration, p. 68-73, Nov. 2001.
IBM Research Disclosure Bulletin, No. 444, Article 178, p. 671, Apr. 2001, McElroy, "Provisions of a Generic Enterprise JavaBean Home Caching Service".

* cited by examiner

*Primary Examiner*—Ario Etienne
*Assistant Examiner*—Clayton R Williams
(74) *Attorney, Agent, or Firm*—Duke W. Yee; Martin McKinley; LaRhonda Jefferson-Mills

(57) ABSTRACT

An alternative registry lookup Java naming and directory interface (JNDI) provider is used to lookup a service endpoint in a registry of a Web service. The alternative registry lookup JNDI provider examines the new registry file for a service-ref-name element and determines if the element is present. If the element is present, the registry lookup JNDI provider retrieves location of the service endpoint using information in the new registry file. If the element is absent, lookup of the service endpoint is deferred to a standard JNDI provider, which determines the location of a service endpoint based on a Web Services Description Language (WSDL) file.

10 Claims, 7 Drawing Sheets

```
                                            440
                    442                    ✓
                      \
            private Context standardProvider;
                 444 ⎯⎯⎯       ⎯⎯446
            public Object lookup(String name) throws NamingException {

Object found = privateLookup(String name);
                                        \
                if(found == null)    448
                    found = standardProvider.lookup(name);
                return found;                \
            }                               450
```

FIG. 7

```
700
702  InitialContext ic = new InitialContext () ;                    704
     TemperatureConverterService tcs = (TemperatureConverterService) ic.lookup(
     "java:comp/env/service/TemperatureConverterService");
706  TemperatureConverter proxy =
     (TemperatureConverter) locater.getPort (TemperatureConverter.class);
```

FIG. 8

```
800
<webservicesclient>
 <service-ref>
  <description>WSDL Service TemperatureConverterService</description>
802 <service-ref-name>service/TemperatureConverterService</service-ref-name>
  <serviceinterface>
  com.ibm.wsad.webservices.session.TemperatureConverterService
  </service-interface>
804 <wsdl-file>WEB-INF/wsdl/TemperatureConverter.wsdl</wsdl-file>
  <jaxrpc-mapping-file>WEB-INF/TemperatureConverter_mapping.xml
  </jaxrpc-mapping-file>
  <service-qname>
   <namespaceURI>http://session.webservices.wsad.ibm.com</namespaceURI>
   <localpart>TemperatureConverterService</localpart>
  </service-qname>
  <port-component-ref>
   <service-endpoint interface>
   com.ibm.wsad.webservices.session.TemperatureConverter
   </service-endpoint-interface>
  </port-component-ref>
 </service-ref>
</webservicesclient>
```

FIG. 9

```
900
902  <wsdl:service name="TemperatureConverterService">
      <wsdl:port binding="intf:TemperatureConverterServiceSoapBinding"
      name="TemperatureConverterService">
904    <wsdlsoap:address location=
       "http://localhost:9080/SOAPWithAttachments/services/TempConverterService"/>
      </wsdl:port>
     </wsdl:service>
```

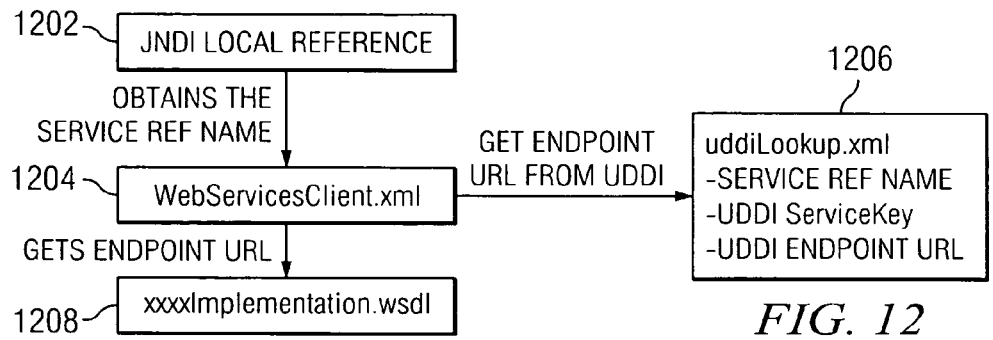

FIG. 12

```
<uddi-endpoint-lookup>  ⟋1300
1304 ⟋   <service-ref-name>service/TemperatureConverterService</service_ref_name>
1310 ⟋   <uddi-url>http://www.ibm.com/services/uddi/inquiryapi</uddi-url>
1302 ⟋   <keyed-lookup-policy>
1306 ⟋     <tmodel-name>Weather Services</tmodel-name>
1308 ⟋     <service-key>
             UUID:C0B9FE13-179F-413D-8A5B-5004DB8E5BB2
           </service-key>
         </keyed-lookup-policy>
       </uddi-endpoint-lookup>
```

FIG. 13

```
<uddi-endpoint-lookup>  ⟋1402
         <service-ref-name>service/TemperatureConverterService</service_ref_name>
         <uddi-url>http://www.ibm.com/services/uddi/inquiryapi</uddi-url>
1404 ⟋   <business-lookup-policy>
1406 ⟋     <business-name>IBM</business-name>
1408 ⟋     <service-name>TemperatureConverter</service-name>
1410 ⟋     <selection-policy>FIRST-IN-LIST</selection-policy>
         </business-lookup-policy>
       </uddi-endpoint-lookup>
```

FIG. 14

ALTERNATIVE REGISTRY LOOKUP OF WEB SERVICES

BACKGROUND OF THE INVENTION

1. Technical Field

The present invention relates generally to Web services architecture. In particular, the present invention provides a method and apparatus for registry lookup of Web services. Still more particularly, the present invention provides a method and apparatus for alternative registry lookup of Web services without impacting existing client implementation.

2. Description of Related Art

In recent years, the use of Internet has greatly increased as more consumers are connecting to the World Wide Web. As a result, consumers demand a wider variety of services to be available online. In order to meet this demand, vendors make their services available by using a mechanism called Web services.

Generally, Web services are services offered by one application, such as a vendor Web site, to other applications, such as consumer applications, via the World Wide Web. By obtaining Web services, consumer or client applications may aggregate these services to enable business transactions. An example Web service may be a client requesting a stock quote online, in which the request of the current price for a specific stock is sent from the client application to a service provider. This request is sent to a given universal resource locator (URL) using common networking communication protocols, such as, for example, simple object access protocol (SOAP) and hypertext transfer protocol (HTTP). The URL identifies the location of the service provider or the service endpoint location. When the service provider receives and processes the request, a response is sent from the service provider using similar protocols to the client application. In this example, the stock price for the requested stock is returned to the client application.

In order to make their services available for client applications, service providers define abstract service descriptions using a language called Web Services Description Language (WSDL), a language specification available from the World Wide Web Consortium (W3C). WSDL provides definition of a service endpoint in the form of a markup language. A concrete service, known as the concrete service description, is created using the abstract service description in WSDL. Service providers may then publish the concrete service description to a registry, such as, for example, a universal description, discovery and integration (UDDI). Using a registry mechanism like UDDI, a service requester locates a service description from which the requestor selects and uses a concrete implementation of the service.

Currently, existing client applications locate service providers in a registry dynamically. Even when a URL of the service provider changes, in failover situations, or multiple implementations of WSDL port type exist for a client to potentially use, a client application may still locate the service provider, but only if custom coding for dynamic lookup is incorporated into the client application explicitly. No standardized mechanism specifying where and how to look up an endpoint location for a Web service currently exists.

Existing lookup mechanisms, such as, for example, Java API for XML registries (JAXR) and UDDI for Java (UDDI4J), require developers of client applications to perform registry lookup each time a service is requested. This repetitive lookup uses machine resources for each lookup and adds to the client execution time as additional requests are sent from the client application. In addition, changes to existing client application implementation are required when location of the service endpoint changes.

Furthermore, existing lookup and registry mechanisms conflict with other solutions, such as, for example, Java API for XML-based remote procedure call (JAX-RPC) and Web services for Java 2 enterprise editor (JSR-109), products available from Sun Microsystems, Inc. These mechanisms use a naming and directory technology called Java naming and directory interface (JNDI) application programming interface (API), which provides methods for client applications to access Web services.

Therefore, it would be advantageous to have an improved method, apparatus and computer instructions for alternative registry lookup of Web services without impacting existing client implementation. It would also be advantageous to have an improved method that leverages existing standards like JAX-RPC and J2EE Web services.

SUMMARY OF THE INVENTION

The present invention provides a method, apparatus, and computer instructions in a data processing system for alternative registry lookup of Web services without impacting existing client implementations. A client application container is provided with an alternative registry lookup Java naming and directory interface (JNDI) provider for accessing Web services. When a client application or service requester requests a Web service, instead of using a Web service description language file directly to locate the service endpoint, the alternative registry lookup JNDI provider is used to determine if a service-ref-name element corresponding to requested service name is present in a new registry file by examining the file.

If the service-ref-name element is present, the alternative registry lookup JNDI provider identifies the service endpoint URL for the requested service name using information from the new registry file to perform lookup in the registry. However, if the service-ref-name element is not present in the new registry file, the alternative registry JNDI lookup provider defers the lookup operation to a standard JNDI provider. The standard JNDI provider then searches a webservicesclient.xml file with the service-ref-name element and locates a WSDL file corresponding to the service-ref-name element by examining the wsdl-file element of the webservicesclient.xml file.

Once the WSDL file is located, the standard JNDI provider determines if the requested service name of the service-ref-name element maps to the wsdl:service element of the WSDL file. If a mapping occurs, the service endpoint URL is identified from the wsdlsoap:address element of the WSDL file.

In addition, the alternative registry lookup JNDI provider may implement a lookup policy in the new registry file in the event of multiple service endpoint URLs so that only a single service endpoint URL is returned to the service requester.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram illustrating an example client container implementation in accordance with a preferred embodiment of the present invention;

FIG. 8 is a diagram illustrating an example implementation of the webservicesclient.xml file in accordance with a preferred embodiment of the present invention;

FIG. 9 is a diagram illustrating an example implementation of a WSDL file in accordance of the present invention;

FIG. 12 is a diagram illustrating an example implementation of a UDDI registry provider in accordance with a preferred embodiment of the present invention;

FIG. 13 is a diagram illustrating an example implementation of the UDDI registry file using a keyed policy in accordance with a preferred embodiment of the present invention; and FIG. 14 is a diagram illustrating an example UDDI registry file using a lookup policy of the present invention in accordance with a preferred embodiment of the present invention.

DETAILED DESCRIPTION OF THE PREFERRED EMBODIMENT

Figure 1:
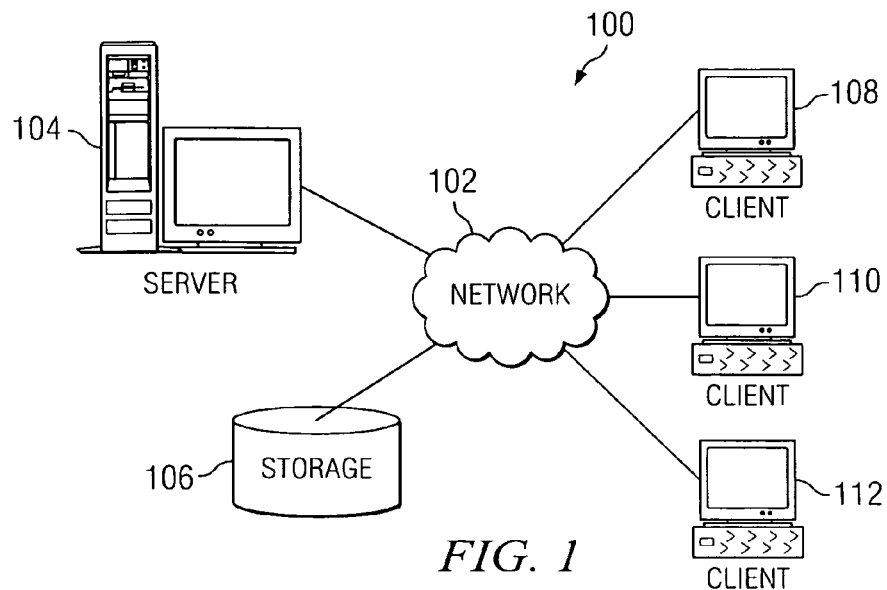
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
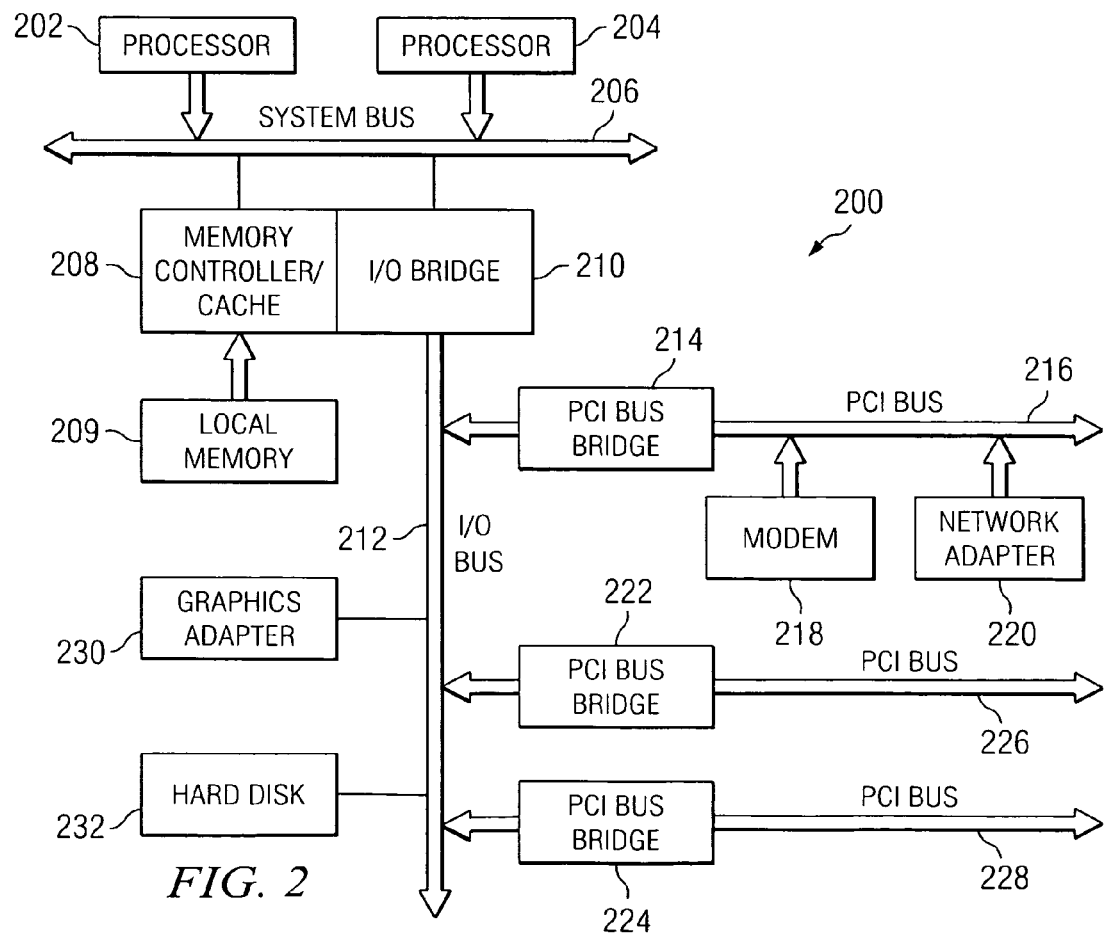
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, New York, running the Advanced Interactive Executive (AIX) operating system or LINUX operating system.

Figure 3:
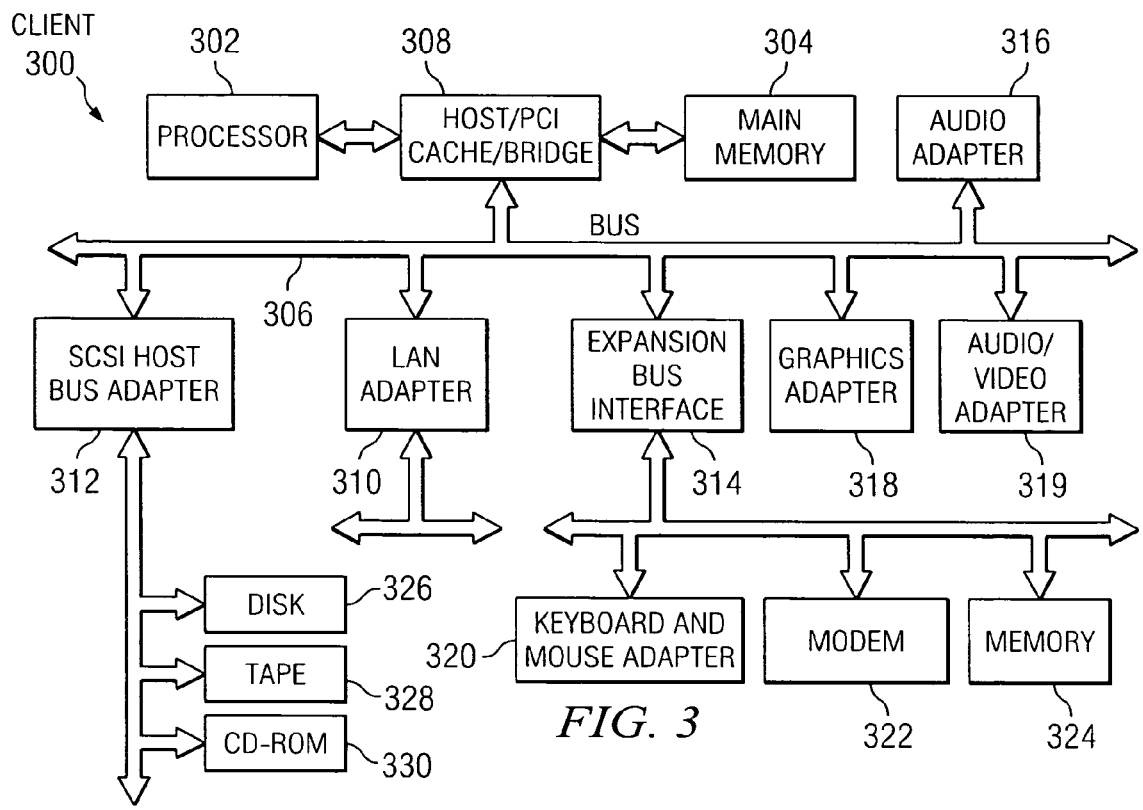
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for alternative registry lookup of Web services without impacting existing client implementations. Instead of changing existing client implementation to accommodate changes of service endpoint location, an innovative registry lookup Java naming and directory (JNDI) provider is provided in a client container for accessing Web services. The innovative registry lookup JNDI provider enables alternative registry lookup by leveraging the client programming model of the J2EE Web services (JSR-109).

Under the J2EE Web services client programming model, a client may be a J2EE client application, a Web component, an enterprise Java bean (EJB) component, or another Web service. A client may use the J2EE Web services run time environment to access and invoke methods of a Web service. In order to access a Web service, the client uses a JNDI lookup to access a service object, which is then used by the client to retrieve a stub or proxy. A stub or proxy is the client representation of an instance of the Web service implementation. The JNDI lookup provides location of the service endpoint to the client in the form of a URL.

In a preferred embodiment, the present invention provides an innovative registry lookup JNDI provider in a client container for looking up a service endpoint location in a registry. A registry, such as, for example, a UDDI registry, includes concrete service locations published by the Web service provider. A registry may be implemented locally on the client, such as client 108 in FIG. 1, or remotely on a server, such as server 104 in FIG. 1, in the form of a registry file.

When a service requester makes a request to lookup a Web service using JNDI, the innovative registry lookup JNDI provider in the client container looks up a service endpoint by first examining the service-ref-name element of a new registry file, such as, for example, a UDDI registry file. Other types of registry file may also be used, such as, for example, a web service inspection language (WSIL) registry file, an electronic business using extensible markup language (ebXML) registry file or a registry file that is implemented using a database. The service-ref-name element represents the name value passed into the JNDI InitialContext object. The IntialContext object provides a starting point into the namespace from which the lookup is performed. The service-ref-name element of the new registry file is examined to determine whether the service name requested is present in the file. An example requested service name is "service/TemperatureConverterService".

If the requested service name is present in the service-ref-name element of the new registry file, the registry lookup JNDI provider uses information from other elements of the new registry file to retrieve a service endpoint location from the registry. Alternatively, if the requested service name is absent in the service-ref-name element of the new registry file, as determined by the alternative registry lookup JNDI provider, the alternative registry lookup JNDI provider defers the lookup operation and the service-ref-name element to a standard JNDI provider.

The standard JNDI provider then searches a webservices-client.xml file for the corresponding service-ref-name element in order to identify the service endpoint location in an additional configuration file, such as, for example, a WSDL file. The webservicesclient.xml file is a default deployment descriptor file defined in the J2EE Web services specification. The standard JNDI provider uses a wsdl-file element in the webservicesclient.xml file to identify the location of the WSDL file. Once the WSDL file is located, the standard JNDI provider determines if the service-ref-name element maps to the wsdl:service element of the WSDL file.

If a mapping occurs, the standard JNDI provider identifies the location of the service endpoint in the wsdlsoap:address element of the WDSL file and returns the endpoint location to the service requester. However, if no mapping occurs, the standard JNDI provider may return an error to the service requester.

Thus, the mechanism of the present invention, an innovative registry lookup JNDI provider, enables alternative registry lookup of the service endpoint URL of the invoked remote Web service, in place of the standard registry lookup through the wsdl:address element of the WSDL file. The alternative registry lookup may be accomplished without the need of changing existing client implementation.

In addition, the alternative registry lookup JNDI provider may provide caching of the service endpoint location obtained from the registry, which helps to avoid unnecessary lookups, hence, improves performance. The registry lookup JNDI provider may maintain a simple data structure, such as, for example, a hash map of local JNDI service names and service endpoint URLs that are retrieved previously. Prior to each registry lookup, the registry lookup JNDI provider may examine the hash map to determine whether the requested service name had been looked up. If the requested service name had been looked up previously, the registry lookup JNDI provider returns the cache version of the service endpoint location from the hash map, as opposed to performing a new lookup.

Furthermore, the alternative registry lookup JNDI may support multiple types of registries by allowing the client to specify an endpoint registry location, any required access control information for the registry, and information required to locate the specific service and corresponding endpoint. Examples of other types of registry include UDDI registry, a web service inspection language (WSIL) registry, an electronic business using extensible markup language (ebXML) registry, and a custom registry that is implemented using a database.

Figure 4A:
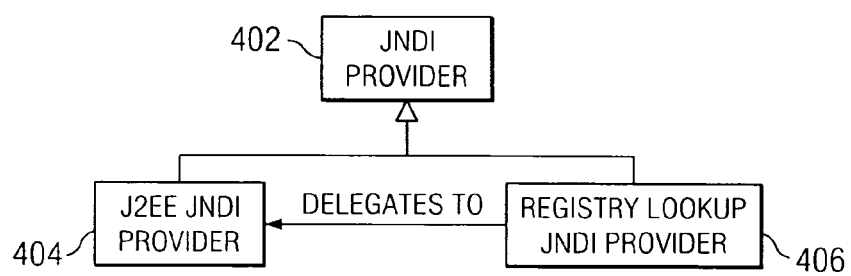
FIG. 4A is a diagram illustrating relationships between JNDI providers of the present invention in accordance with a preferred embodiment of the present invention.

Turning now to FIG. 4A, a diagram illustrating relationships between JNDI providers of the present invention is depicted in accordance with a preferred embodiment of the present invention. As depicted in FIG. 4A, JNDI provider 402 provides an abstract definition of the JNDI provider as defined in the JNDI specification. Examples of abstract definition required for the JNDI provider are context implementation, name parsers, URL context implementations, etc. However, subclasses of the JNDI provider may implement a subset of the abstract definitions. With the present invention, there are two JNDI providers that implement JNDI provider 402: J2EE JNDI provider 404 and registry lookup JNDI provider 406. Registry lookup JNDI provider 406 implements all of the abstract interfaces defined in the JNDI specification and delegates part of its implementation to another JNDI provider, in this example, J2EE JNDI provider 404. In this way, if the requested service name is not present in the service-ref-name element of the new registry file, registry lookup JNDI provider 406 may delegate the lookup of service endpoint to J2EE JNDI provider 404. JNDI providers 404 and 406 may be implemented in a client container, which runs on a client, such as client 108 in FIG. 1.

Figures 4B, 5:
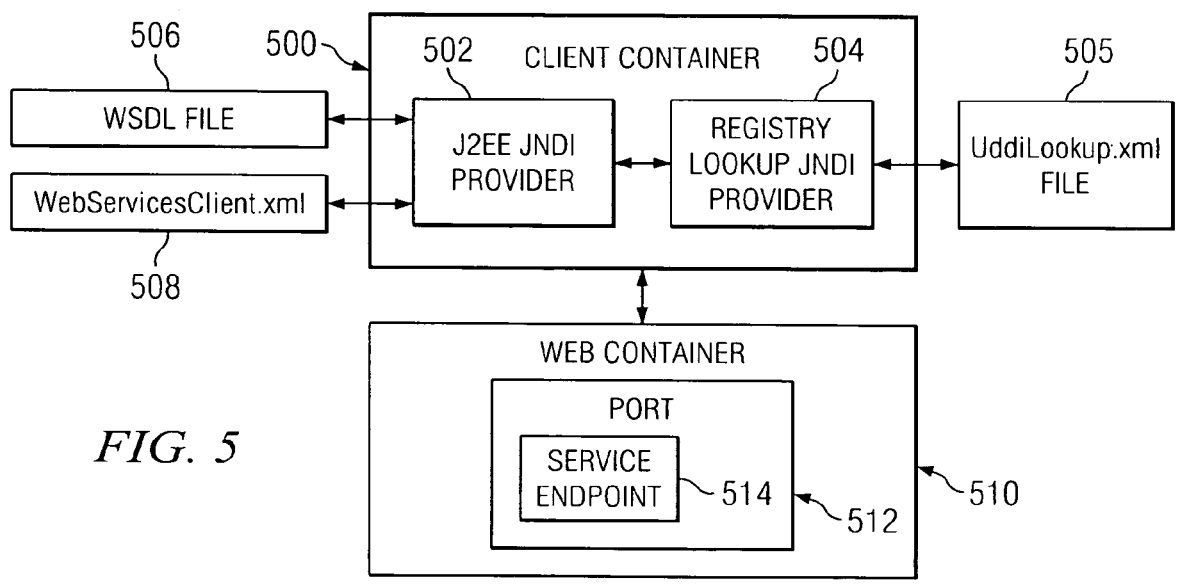
FIG. 4B is a diagram illustration an example implementation of delegating lookup to a standard JNDI provider in accordance with the present invention.
FIG. 5 is a diagram of components used in the present invention in a preferred embodiment of the present invention.

Turning now to FIG. 4B, a diagram illustrating an example implementation of delegating lookup to a standard JNDI provider is depicted in accordance with the present invention. As depicted in FIG. 4B, in this example implementation, registry lookup JNDI provider 440 includes a reference to standard-provider 442. When a service requester initiates a lookup 444 with service name 446 requested as the parameter. Private-Lookup 448 method, which is a method in registry lookup JNDI provider 440, performs lookup in the new registry file. If the service name is found in the service-ref-name element of the new registry file, the stub of the endpoint URL found is returned. However, if no stub is returned as a result of private-Lookup 448, registry lookup JDNI registry 400 defers the lookup operation to standardprovider 442 by calling the lookup method 450 of standardprovider 442 and passing the service name 446 to lookup method 450 as an input parameter. StandardProvider 448 performs the appropriate lookup in other registry files, such as, for example, a WSDL file and returns the endpoint URL.

Turning next to FIG. 5, a diagram of components used in the present invention is depicted in a preferred embodiment of the present invention. As depicted in FIG. 5, client container 500 may be implemented as a client application that runs on a client, such as client 100 in FIG. 1. A service requester or client directly interacts with client container 500 to request a Web service. When client container 500 receives the request, registry lookup JNDI provider 504 provided by the present invention is used for alternative registry lookup. Registry lookup JNDI provider 504 first examines a registry file, such as, for example, UddiLookup.xml file 505, for an element called service-ref-name.

If the service-ref-name element is present with the requested service name, a lookup is performed by registry lookup JNDI provider 504 to retrieve the service endpoint URL from UddiLookup.xml file 505. Based on other information, such as a tModel name and a service key, in UddiLookup.xml file 505, the service endpoint URL may be retrieved. From the retrieved service endpoint location URL, client container 500 may access service endpoint 514 by obtaining a stub implementation of port 512, which resides on Web container 510.

Alternatively, if no service-ref-name element is present with the requested service name in UddiLookup.xml file 505, registry lookup JNDI provider 504 delegates the lookup operation to a standard JNDI provider, such as, J2EE JNDI provider 502, which then examines webservicesclient.xml file 508 to locate an additional configuration file, in this example, WSDL file 506. WSDL file 506 includes a wsdl:address element that identifies the service endpoint URL. Similarly, based on this service endpoint URL retrieved by J2EE JNDI provider 502, client container 500 may access service endpoint 514, via a stub implementation of port 512, which resides on Web container 510.

Figure 6:
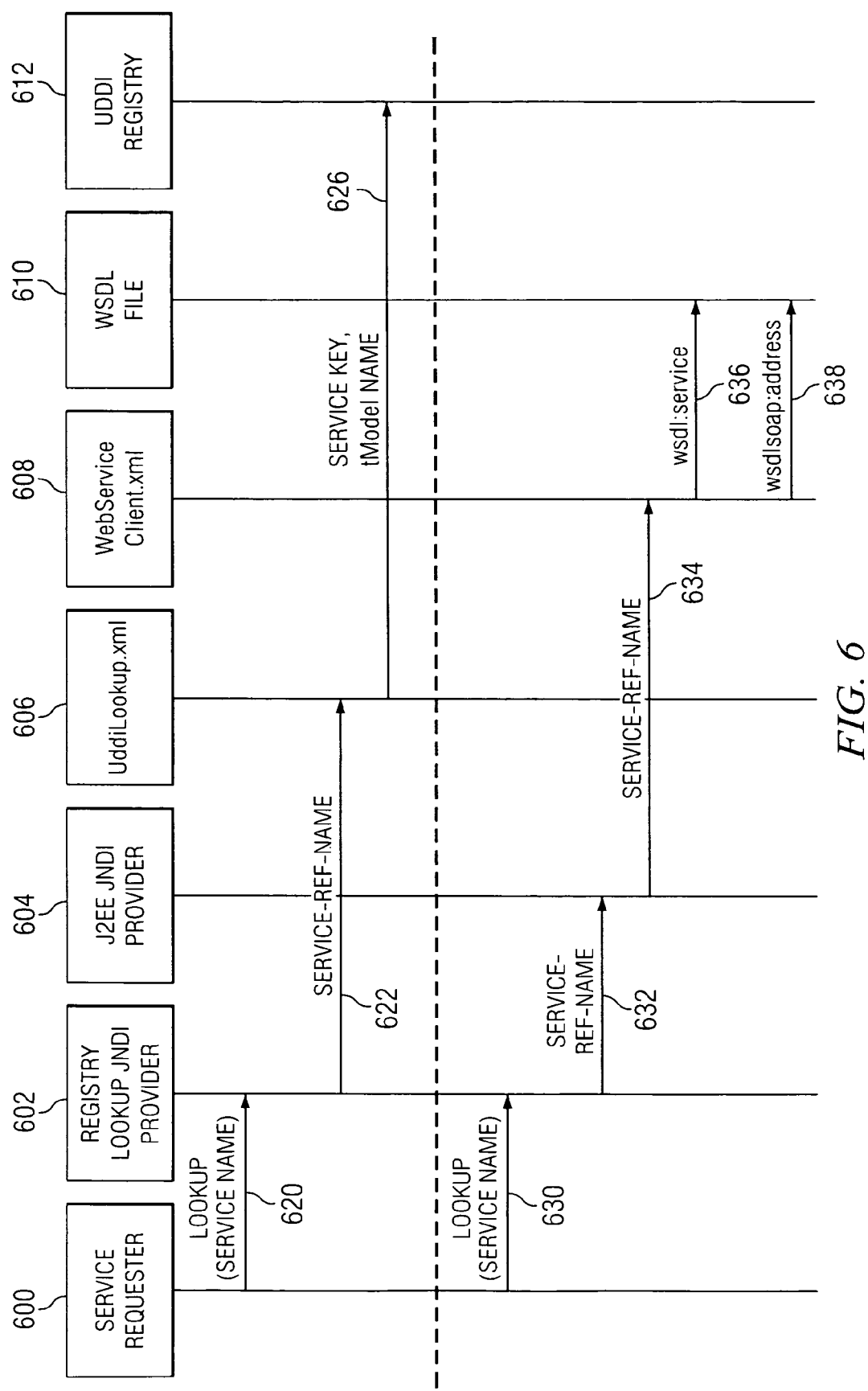
FIG. 6 is a diagram illustrating interaction between components used in the present invention in a preferred embodiment of the present invention.

With reference to FIG. 6, a diagram illustrating interaction between components used in the present invention is depicted in a preferred embodiment of the present invention. As depicted in FIG. 6, service requester 600 may initiate a registry lookup request for a Web service by calling a lookup method of new registry lookup JNDI provider 602 and providing the requested service name as the parameter (call 620). Upon receiving the request, registry lookup JNDI provider 602 examines the service-ref-name element of the UddiLookup.xml file 606 using the service name parameter and determines whether the service-ref-name element is present with the requested service name (call 622). If the service-ref-name element is present with the requested service name, new registry lookup JNDI provider 602 examines UddiLookup.xml file 604 and identifies information, such as a tModel name and a service key (call 626), necessary to retrieve location of service endpoint from UDDI registry 612.

Alternatively, similar to the above example, upon initiation of lookup (call 630) by service requester 600 and examining of service-ref-name element in the UddiLookup.xml file 606, if the service-ref-name element is not present with the requested service name in UddiLookup.xml file 606, new registry lookup JNDI provider 602 delegates the lookup and the service-ref-name element to a standard JNDI provider (call 632), such as J2EE JNDI provider 604. J2EE JNDI provider 604 then searches webservicesclient.xml file 608 using the service-ref-name element for the location of WSDL file 610 (call 634). The location of WSDL file 610 is based on a wsdl:file element in webservicesclient.xml file 608.

Once WSDL file 610 is located, J2EE JNDI provider 604 determines whether the wsdl:service element in WSDL file 610 maps to the service-ref-name element of the webservicesclient.xml file 608 (call 636). If mapping occurs, J2EE JNDI provider 604 retrieves the service endpoint URL based on the wsdlsoap:address element of the WSDL file 610 (call 638).

With reference to FIG. 7, a diagram illustrating an example client container implementation is depicted in accordance with a preferred embodiment of the present invention. As depicted in FIG. 7, in this example implementation of client code 700, a service requester requests the initial context 702, which is a starting point into the namespace, to lookup 704 a service with a name of "java:comp/env/service/TemperatureConverterService". As a result of the lookup, a stub of TemperatureConverterService, TemperatureConverter 706, is retrieved based on the service endpoint URL provided by the new registry lookup JNDI provider. The stub acts as a proxy to the Web service requested, in this example, the TemperatureConverterService.

With reference now to FIG. 8, a diagram illustrating an example implementation of the webservicesclient.xml file is depicted in accordance with a preferred embodiment of the present invention. As depicted in FIG. 8, webservicesclient.xml file 800 includes service-ref-name element 802 and wsdl-file element 804. Service-ref-name element 802 declares a logical name that the client container uses to lookup a Web service.

When a standard JNDI provider is delegated to perform a lookup, the standard JNDI provider examines service-ref-name element 802 to determine whether it maps to the requested service name passed from the registry lookup JNDI provider. In this example, service-ref-name element 802 has a value of "service/TemperatureConverterService".

If a mapping occurs, the standard JNDI provider proceeds to examine wsdl-file element 808, which contains the URI location of a WSDL file. In this example, the location of the WSDL file is "WEB-INF/wsdl/TemperatureConverter.wsdl." The WSDL file is described in further details in FIG. 9.

Turning now to FIG. 9, a diagram illustrating an example implementation of a WSDL file is depicted in accordance of the present invention. As depicted in FIG. 9, in this example implementation, WSDL file 900 is located by the standard JNDI provider using wsdl-file element 804 in FIG. 8. WSDL file 900 includes wsdl:service element 902. When the standard JNDI provider examines wsdl:service element 902, a determination is made as to whether the name attribute maps to the requested service name in the service-ref-name element passed from the registry lookup JNDI provider. If a mapping occurs, the standard JNDI provider looks up the location of service endpoint by examining the wsdlsoap:address element 904 of WSDL file 900. In this example, the service endpoint is located at URL, "http://localhost:9080/SOAPWithAttachments/services/TempConverterService". From this URL, the standard JNDI provider may retrieve a stub of the service endpoint interface.

Figure 10:
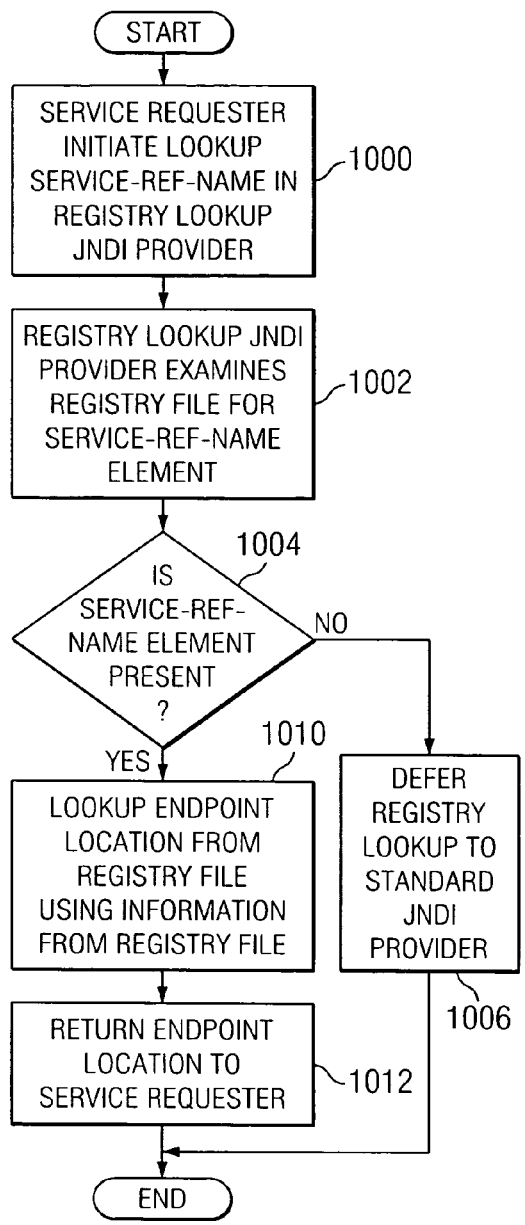
FIG. 10 is a flowchart diagram illustrating an exemplary process of performing alternative registry lookup in accordance with a preferred embodiment of the present invention.

Turning next to FIG. 10, a flowchart diagram illustrating an exemplary process of performing alternative registry lookup is depicted in accordance with a preferred embodiment of the present invention. As depicted in FIG. 10, the process begins when a service requester initiates a lookup of a Web service by calling the lookup method of the initial context with a service name passed as a parameter (step 1000). Next, the registry lookup JNDI provider examines the new registry file, such as UddiLookup.xml file, for a service-ref-name element (step 1002). A determination is made as to whether the service-ref-name element is present in the new registry file (step 1004). If the element is present, the registry lookup JNDI provider looks up the service endpoint location using information from the registry file (step 1010). Once the service endpoint location is identified, the service endpoint location is returned to the service requester (step 1012) and the process terminating thereafter.

Alternatively, if the registry lookup JNDI provider determines that the service-ref-name element is absent, the registry lookup JNDI provider defers the registry lookup to a standard JNDI provider, such as, for example, a J2EE JNDI provider (step 1006) and the process terminating thereafter.

Figure 11:
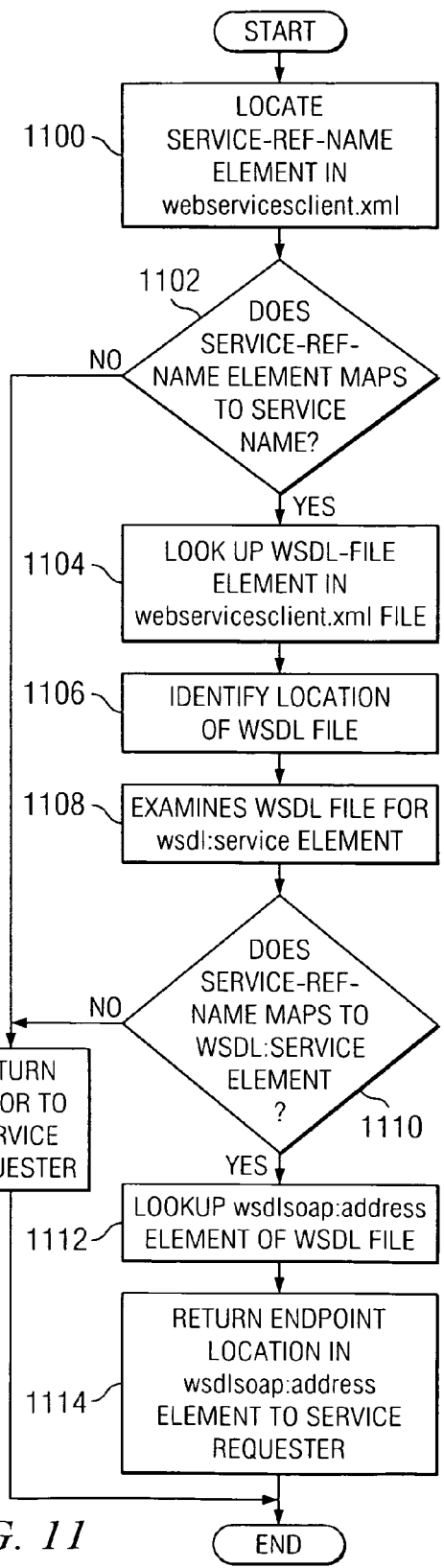
FIG. 11 is a flowchart diagram illustrating an exemplary process of registry lookup performed by a standard JNDI provider in accordance with a preferred embodiment of the present invention.

Turning next to FIG. 11, a flowchart diagram illustrating an exemplary process of registry lookup performed by a standard JNDI provider is depicted in accordance with a preferred embodiment of the present invention. This flowchart provides a more detailed description of step 1006 in FIG. 10. As depicted in FIG. 11, the process begins when a standard JNDI provider, such as, for example, a J2EE JNDI provider, locates the service-ref-name element in the default webservicesclient.xml file (step 1100). A determination is then made as to whether the service-ref-name element of the webservicesclient.xml file maps to the service name passed from the service-ref-name element of the registry lookup JNDI provider (step 1102). If no mapping occurs, the standard JNDI provider returns an error to the service requester (step 1116) and the process terminating thereafter.

However, if mapping occurs in step 1110, the standard JNDI provider looks up the wsdl-file element in the webservicesclient.xml file (step 1104). The wsdl-file element from the webservicesclient.xml file is used to identify location of the WSDL configuration file (step 1106). Once the WSDL file is located, the standard JNDI provider examines the WSDL file for a wsdl:service element (step 1108), which includes a name attribute. Next, a determination is made as to whether the service name specified in the service-ref-name element delegated by the registry lookup JNDI provider maps to the name attribute of the wsdl:service element (step 1110). If a mapping occurs, the standard JNDI provider looks up the wsdlsoap:address element of the WSDL file (step 1112), which includes location of the service endpoint. The standard JNDI provider then returns the service endpoint location in the wsdlsoap:address element to the service requester (step 1114) and the process terminating thereafter.

However, if no mapping occurs in step 1110, the standard JNDI provider returns an error to the service requester (step 1116) and the process terminating thereafter.

Turning now to FIG. 12, a diagram illustrating an example implementation of a UDDI registry provider is depicted in accordance with a preferred embodiment of the present invention. As depicted in FIG. 12, in order to obtain a lookup of a service endpoint URL for a JNDI local reference 1202, a UDDI service key and a tModel name is required. The UDDI service key and the tModel name are both located in a new registry file, in this example, UDDILookup.xml file 1206.

When a request is sent from a service requester, the registry lookup JNDI provider of the present invention obtains the service-ref-name from JNDI local reference 1202. Next, the provider examines UDDILookup.xml file 1206 and determines if corresponding service-ref-name element in UDDILookup.xml file 1206 is present. If corresponding service-ref-name element in UDDILookup.xml file 1206 is present, the registry lookup JNDI provider uses the service-ref-name as a key to obtain the UDDI service key and the tModel name from the UDDILookup.xml file 1206, in order to retrieve the UDDI endpoint URL. The UDDI endpoint URL is then cached by the registry lookup JNDI provider for future lookups.

However, if corresponding service-ref-name is not present in UDDILookup.xml file 1206, the registry lookup JNDI provider defers the lookup to a standard JNDI provider, which locates WSDL file 1208 via webservicesclient.xml file 1204 and retrieves the endpoint URL from WSDL file 1208.

Turning now to FIG. 13, a diagram illustrating an example implementation of the new UDDI registry file using a keyed policy is depicted in accordance with a preferred embodiment of the present invention. As depicted in FIG. 13, uddi-endpoint-lookup element 1300 is an example implementation of the new UDDI registry file, such as UDDILookup.xml file 1206 in FIG. 12. In this example, uddi-endpoint-lookup element 1300 includes a keyed-lookup-policy element 1302. Keyed-lookup-policy element 1302 includes a service-ref-name element 1304, which is examined by the registry lookup JNDI provider to determine if the requested service name is present. If service-ref-name element 1304 is present with the requested service name, the registry lookup JNDI provider uses service-ref-name element 1304 as a key to obtain tModel-name 1306 and service-key element 1308. In this example, a keyed lookup policy is employed, which requires tModel-name 1306 and service-key element 1308 to lookup an endpoint URL from UDDI-url 1310. The keyed lookup policy returns either zero or one endpoint URL.

In a case when the UDDI registry, in this example, uddi-endpoint-lookup element 1300, is searched using other parameters, which return more than one endpoint URLs, a limiting algorithm may be used to determine the exact endpoint URL to choose by defining a lookup policy. An example of multiple endpoint URLs search may be a search of endpoint URLs that implements a particular service provided by a particular company. With the present invention, the registry lookup JNDI provider may implement a number of lookup policies from the registry file, such as, for example, taking the first endpoint from a list of endpoint URLs, or taking the endpoint URL that is available for the longest time.

Turning next to FIG. 14, a diagram illustrating an example UDDI registry file using a lookup policy of the present invention is depicted in accordance with a preferred embodiment of the present invention. As depicted in FIG. 14, uddi-endpoint-lookup element 1402 is similar to uddi-endpoint-lookup element 1300 in FIG. 13, except that a lookup policy is defined using business-lookup-policy element 1404. In this example, the search for an endpoint URL is according to business-name 1406, IBM, and by service-name 1408, TemperatureConverter. Since multiple endpoint URLs may be returned from this search, a selection-policy 1410 is used to select only the first endpoint URL in the list, as specified by FIRST-IN-LIST.

During registry lookup, the registry lookup JNDI provider of the present invention can also handle lookup failures by directly reporting the error back to the service requester, or deferring the error to be handled by the standard JNDI provider, which acts as a backup provider for obtaining a fixed endpoint URL. These error-handling functions may be performed using the NamingException mechanism, which is part of the JNDI specification.

Thus, the present invention provides an alternative registry lookup using an innovative registry lookup JNDI provider. The innovative registry lookup JNDI provider examines the service-ref-name element of the new registry file upon receiving a request for a Web service, and determines whether the service-ref-name element corresponding to the requested service name is present in the new registry file. If the element is present, the registry lookup JNDI provider locates the service endpoint URL using information from the new registry file. The registry lookup JNDI provider then retrieves the endpoint URL and returns it back to the service requester.

If the service-ref-element is absent in the new registry file, the registry lookup JNDI provider defers the service-ref-name element with the requested service name to a standard JNDI provider, which then locates a WSDL file from a wsdl-file element in a webservicesclient.xml file. The standard JNDI provider then uses the deferred service-ref-name element as a key to map to the wsdl:service element of the WSDL file. If a mapping occurs, the standard JNDI provider retrieves the endpoint URL from the wsdlsoap:address element and returns it back to the service requester. If no mapping occurs, the standard JNDI provider instead returns an error back to the service requester indicating the failure.

In addition, the innovative registry lookup JNDI provider may improve performance of registry lookup by caching the endpoint URL retrieved for subsequent registry lookups using a data structure, such as, for example, a hash map. The registry lookup JNDI provider may also support other types of registries, such as, for example, a WSIL registry, a UDDI registry, an electronic business using extensible markup language (ebXML) registry, and a custom registry implemented using a database. This may be accomplished by allowing the client to specify the endpoint registry location and other necessary access control information in the registry lookup JNDI provider.

Furthermore, the innovative registry lookup JNDI provider may implement lookup policies in the new registry file. The lookup policies define specific rules governing selection of a particular endpoint URL in case of a lookup that returns multiple endpoint URLs. An error handling function may also be implemented in the registry lookup JNDI provider by using the NamingException mechanism to return lookup failures to the client or to defer error handling to another JNDI provider.

In summary, by using the innovative registry lookup JNDI provider, the need for changing existing client implementation is no longer required. The registry lookup JNDI provider also takes advantage of, rather than in conflict with, the JNDI application programming interface (API) and the J2EE Web services specifications to provide an alternative mechanism for registry lookup of Web services. Finally, by caching the endpoint URLs retrieved previously, the registry lookup JNDI provider eliminates the cumbersome task of performing a lookup each time a service is requested, thus, improves registry lookup performance.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system to identify a Web service in a registry using a registry lookup naming and directory provider, the computer implemented method comprising:

detecting a request from a service requester to identify the Web service in the registry;

responsive to detecting the request, determining if a first element is present in a registry file;

responsive to determining the first element is present in the registry file, locating a second element in the registry file based on the first element in the registry file;

locating an endpoint location of the Web service based on the second element in the registry file;

retrieving an instance of the Web service based on the endpoint location;

returning the instance of the Web service to the service requester;

responsive to determining that the first element is absent from the registry file, deferring identification of the Web service to a standard naming and directory provider and passing the request to the standard naming and directory provider;

locating an additional configuration file;

responsive to determining that the first element is absent from the registry file, determining whether the first element is present in the additional configuration file;

responsive to determining the first element is present in the additional configuration file, locating the endpoint location identified by the first element in the additional configuration file; and returning the endpoint location to the service requester.

2. The method of claim 1, wherein the request includes a Java naming and directory interface request.

3. The method of claim 1, wherein the request includes a parameter representing a name of the Web service.

4. The method of claim 3, wherein determining if a first element is present in the registry file includes determining if the name of the Web service maps to the first element.

5. The method of claim 1, wherein the first element includes a service-ref-name element.

6. The method of claim 1, wherein the registry file includes one of a UDDI registry file, an electronic business using extensible markup language registry file, a, a web service inspection language registry file, and a custom registry file implemented using a database.

7. The method of claim 1, wherein locating an additional configuration file includes locating a wsdl-file element in a webservicesclient.xml file.

8. The method of claim 1, wherein determining if a first element is present in the additional configuration file includes determining if a name of the Web service from the request maps to the service name element.

9. The method of claim 1, wherein locating an endpoint location of the Web service based on the second element in the registry file includes determining if a lookup policy element exists in the registry file, wherein the lookup policy element includes a selection policy element.

10. The method of claim 9, wherein the registry lookup naming and directory provider selects a single endpoint location from a plurality of endpoint locations based on a selection policy in the selection policy element.

* * * * *